Nov. 27, 1928.  
B. RADTKE  
1,693,403  
WRAPPING MACHINE  
Filed July 19, 1926 13 Sheets-Sheet 8
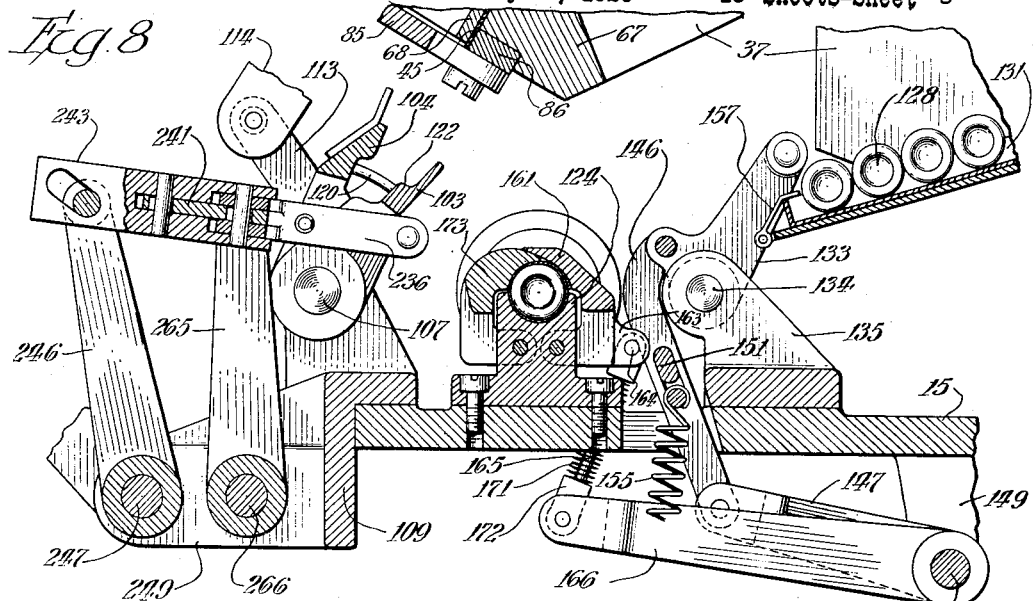
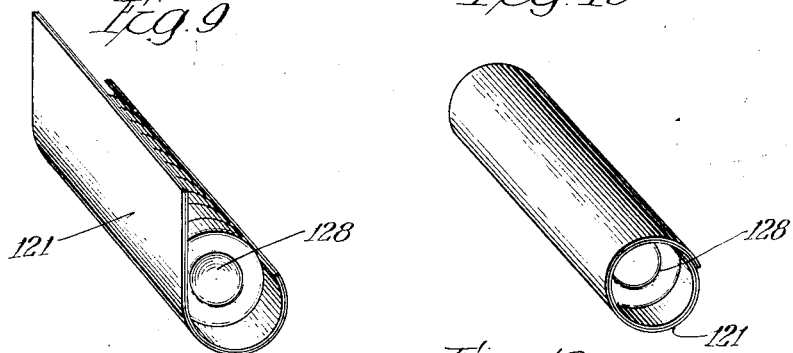
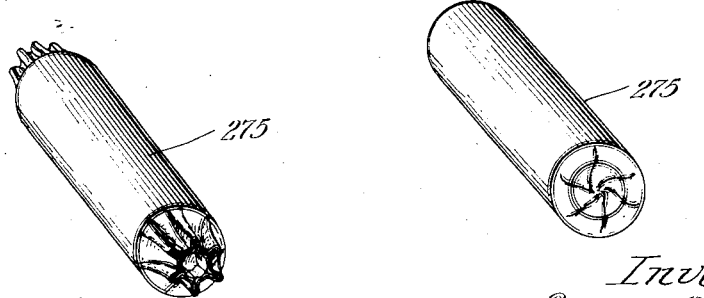
Inventor:
Bruno Radtke
By: Carl S. Lloyd
Atty.

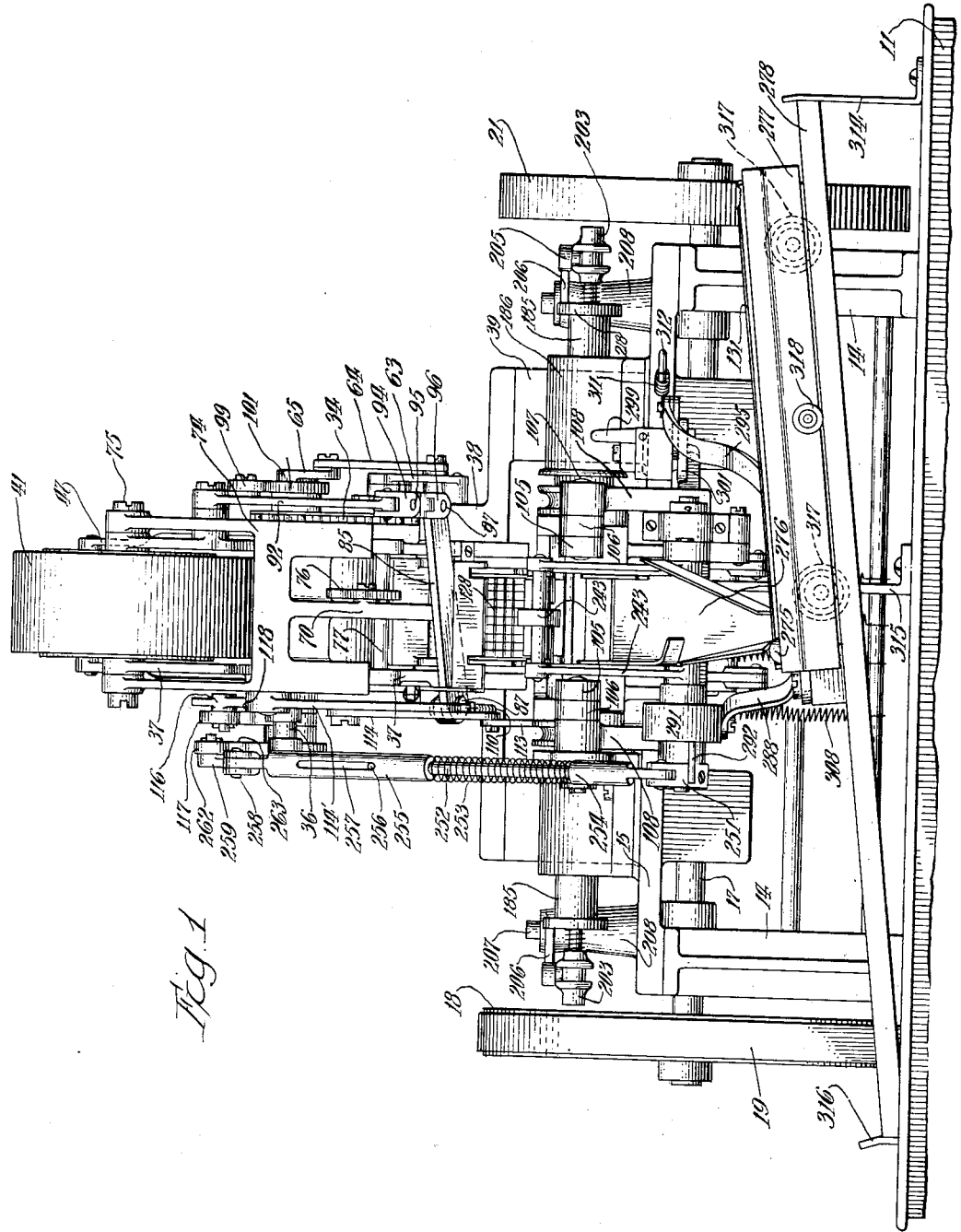

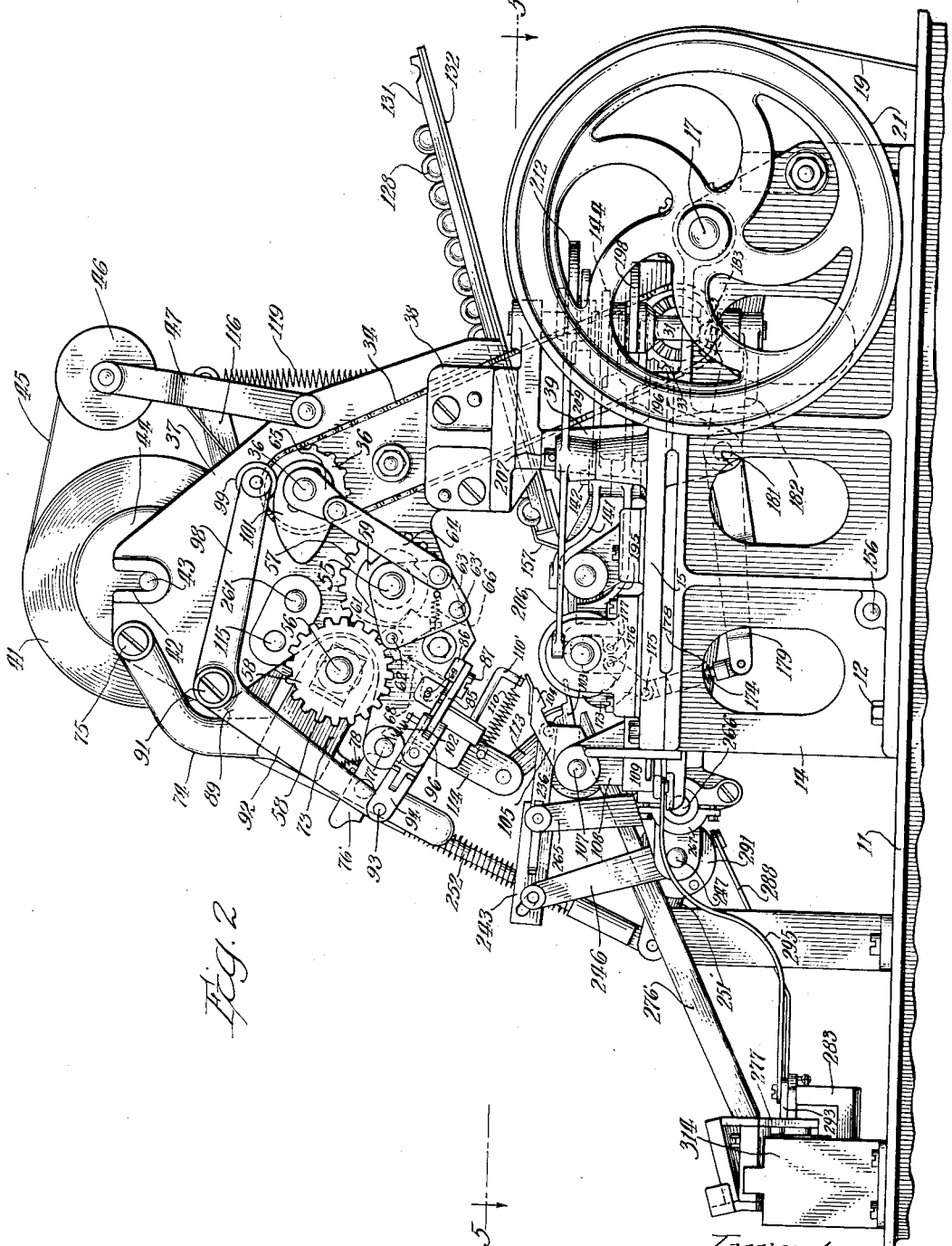

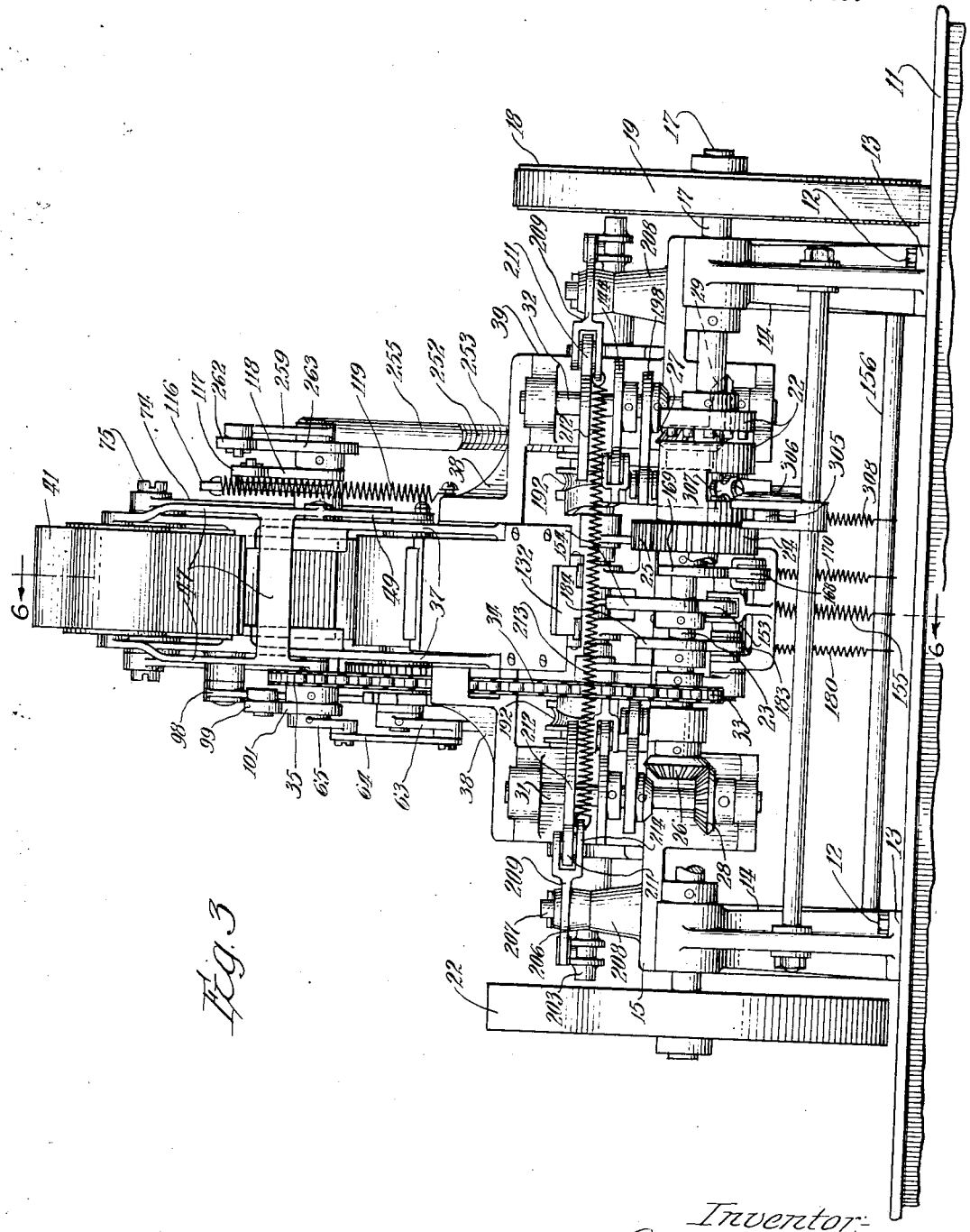

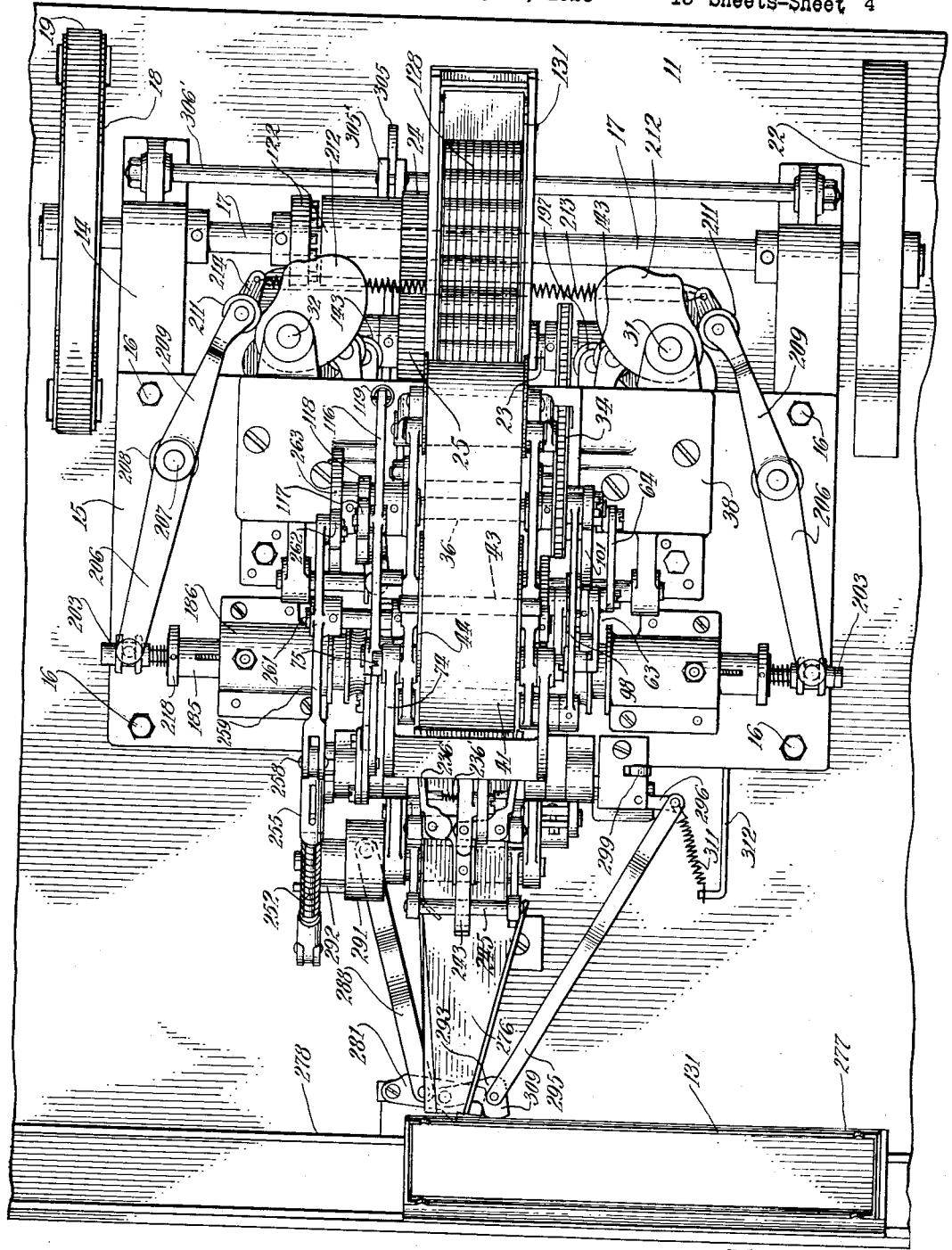

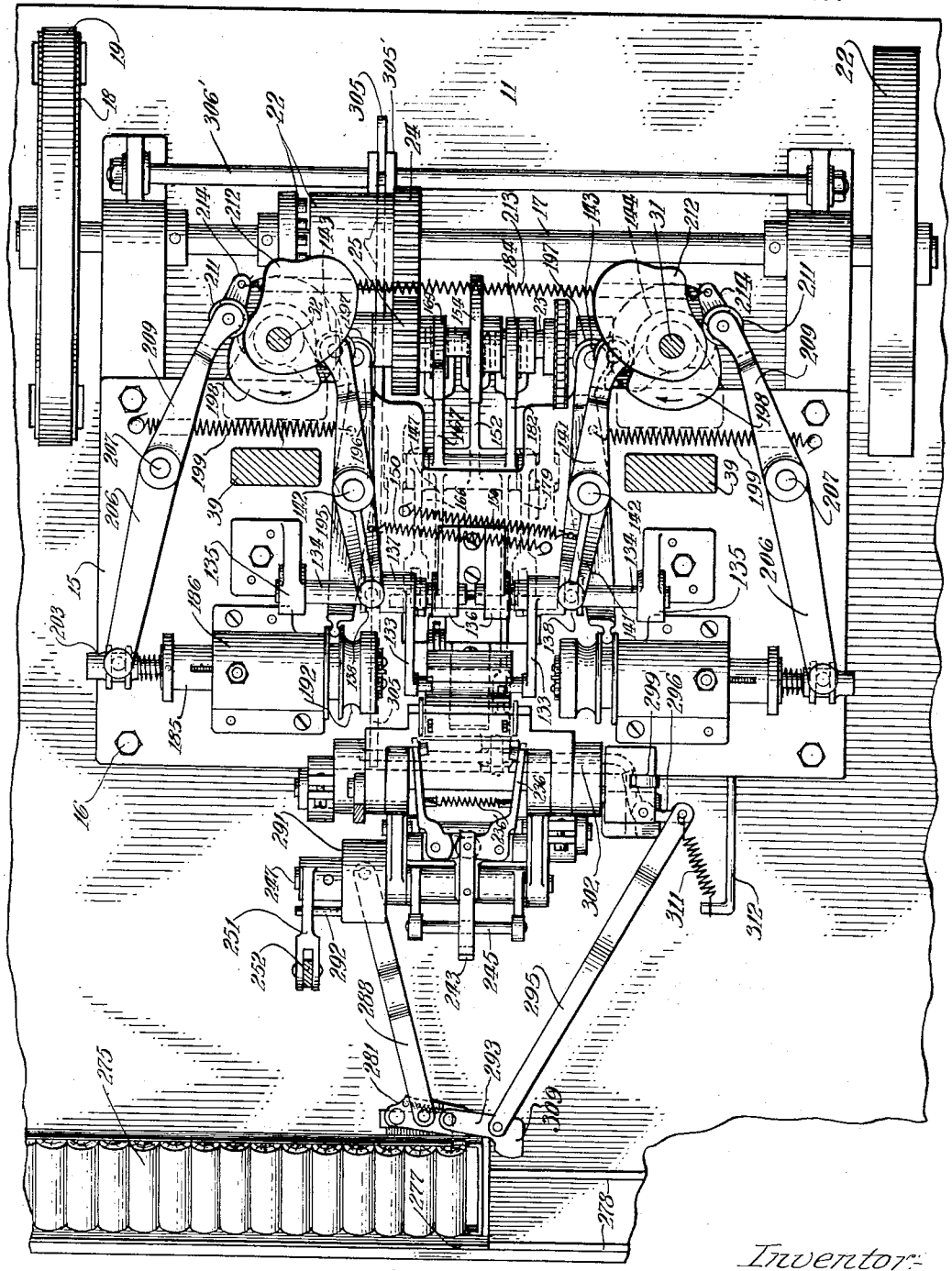

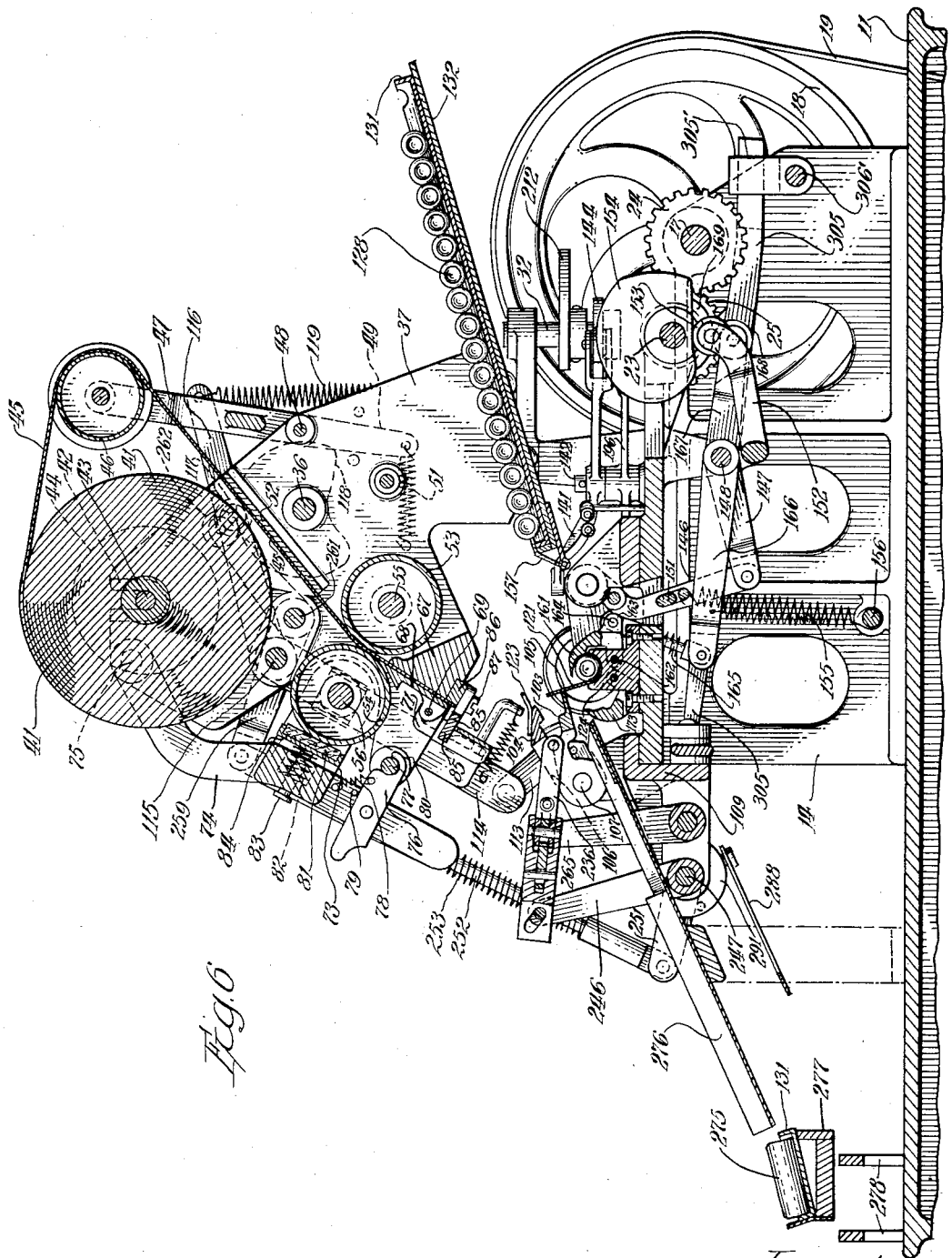

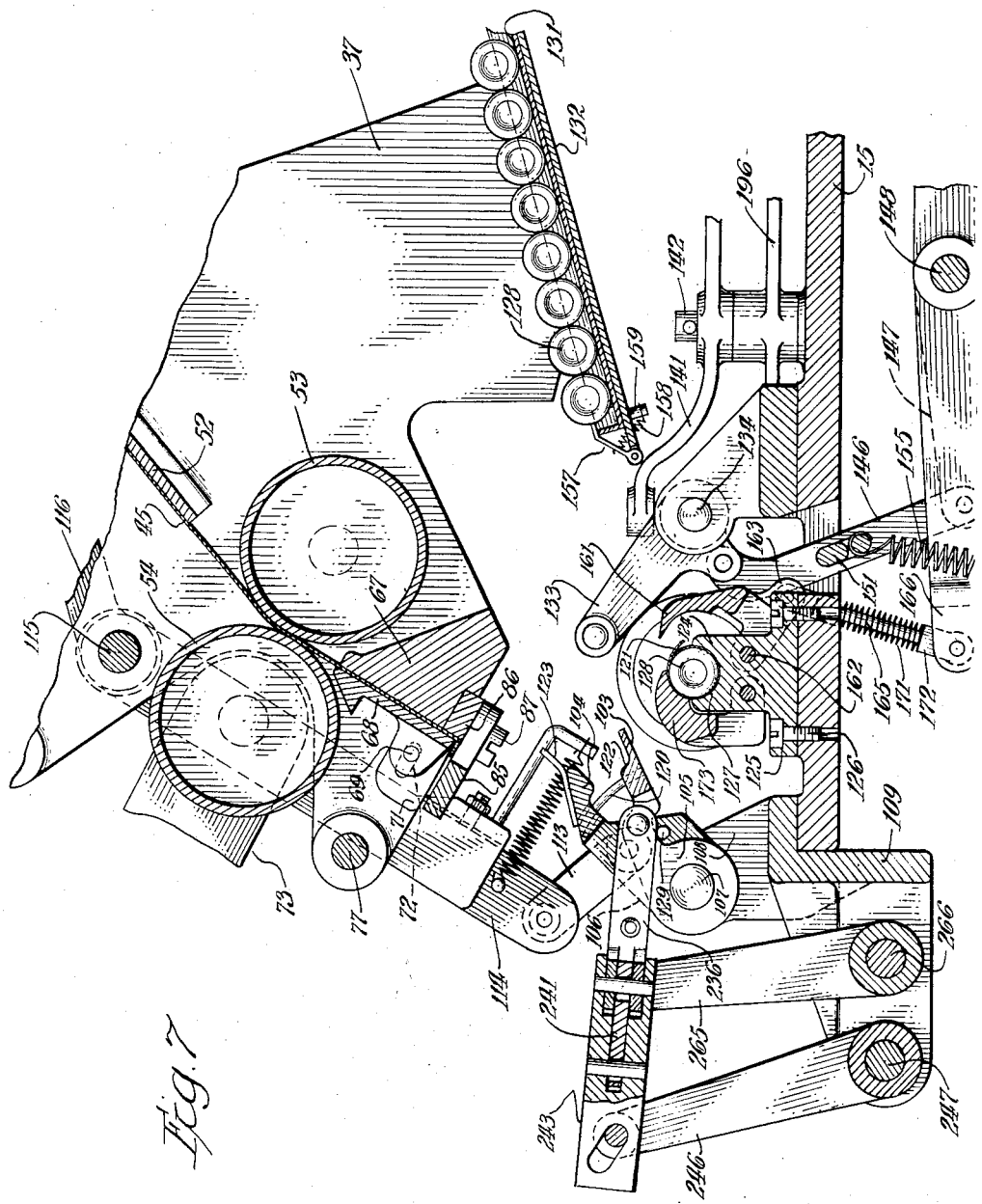

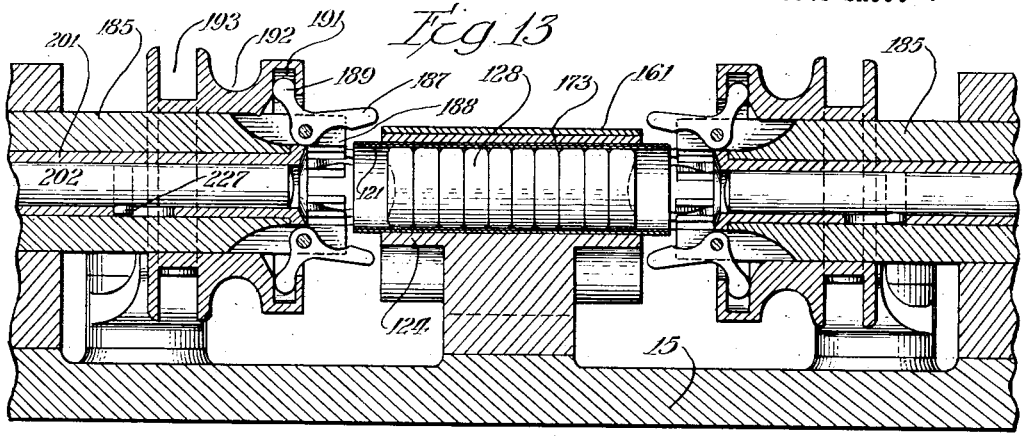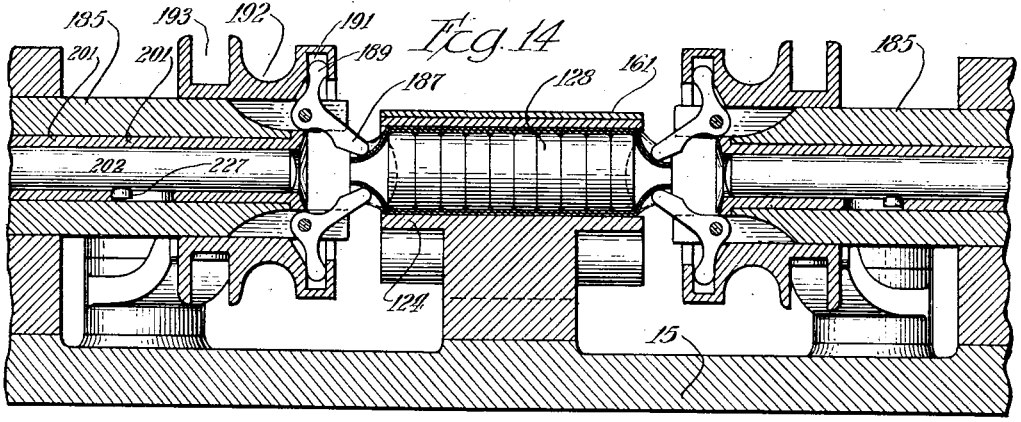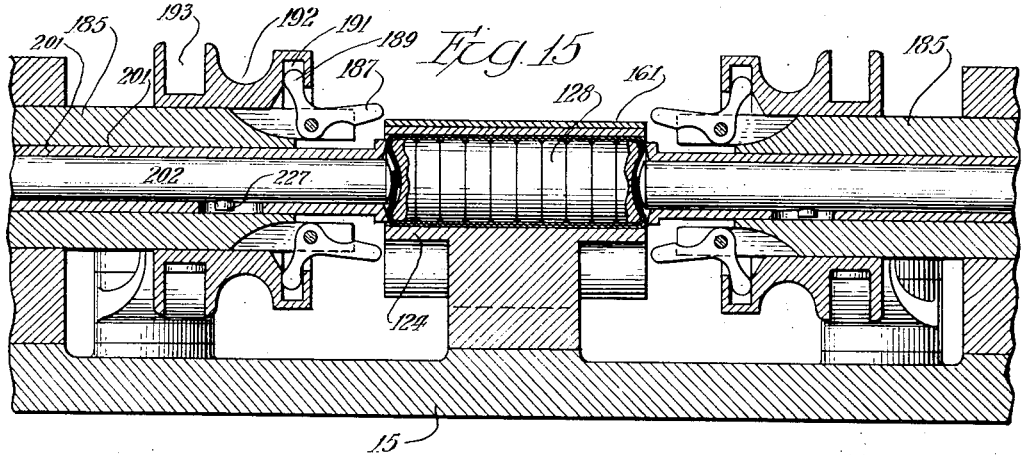

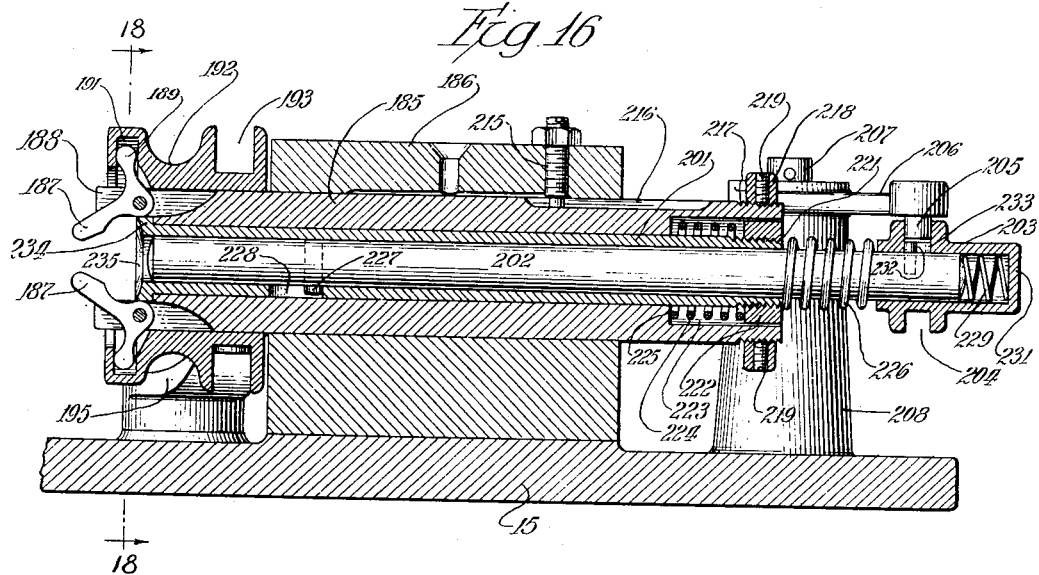
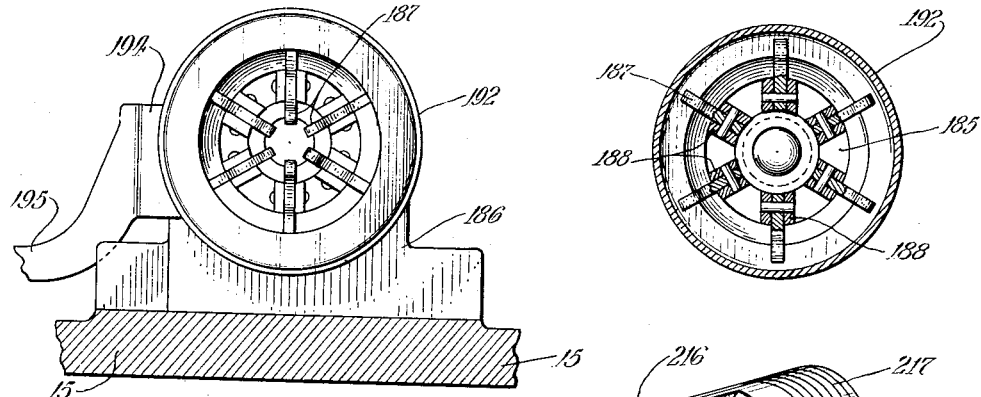
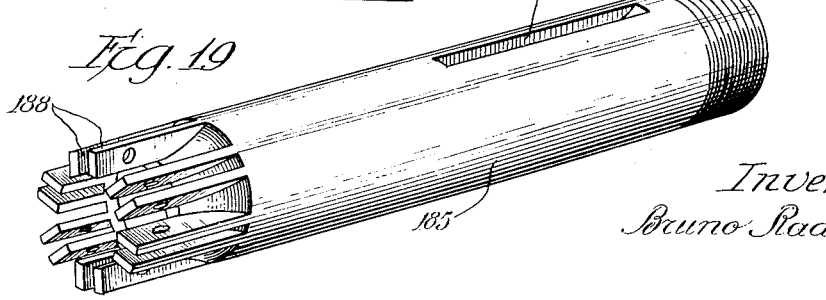

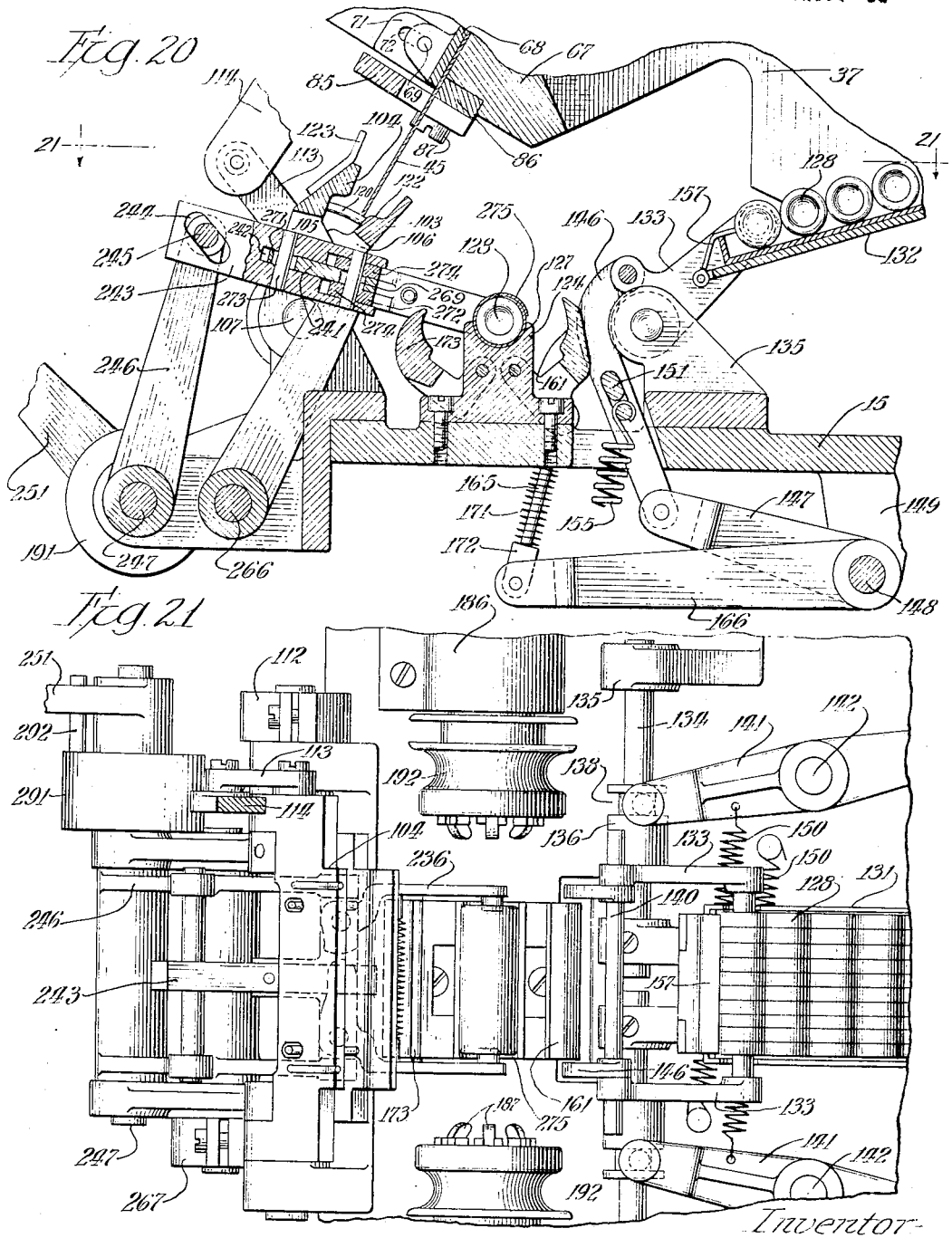

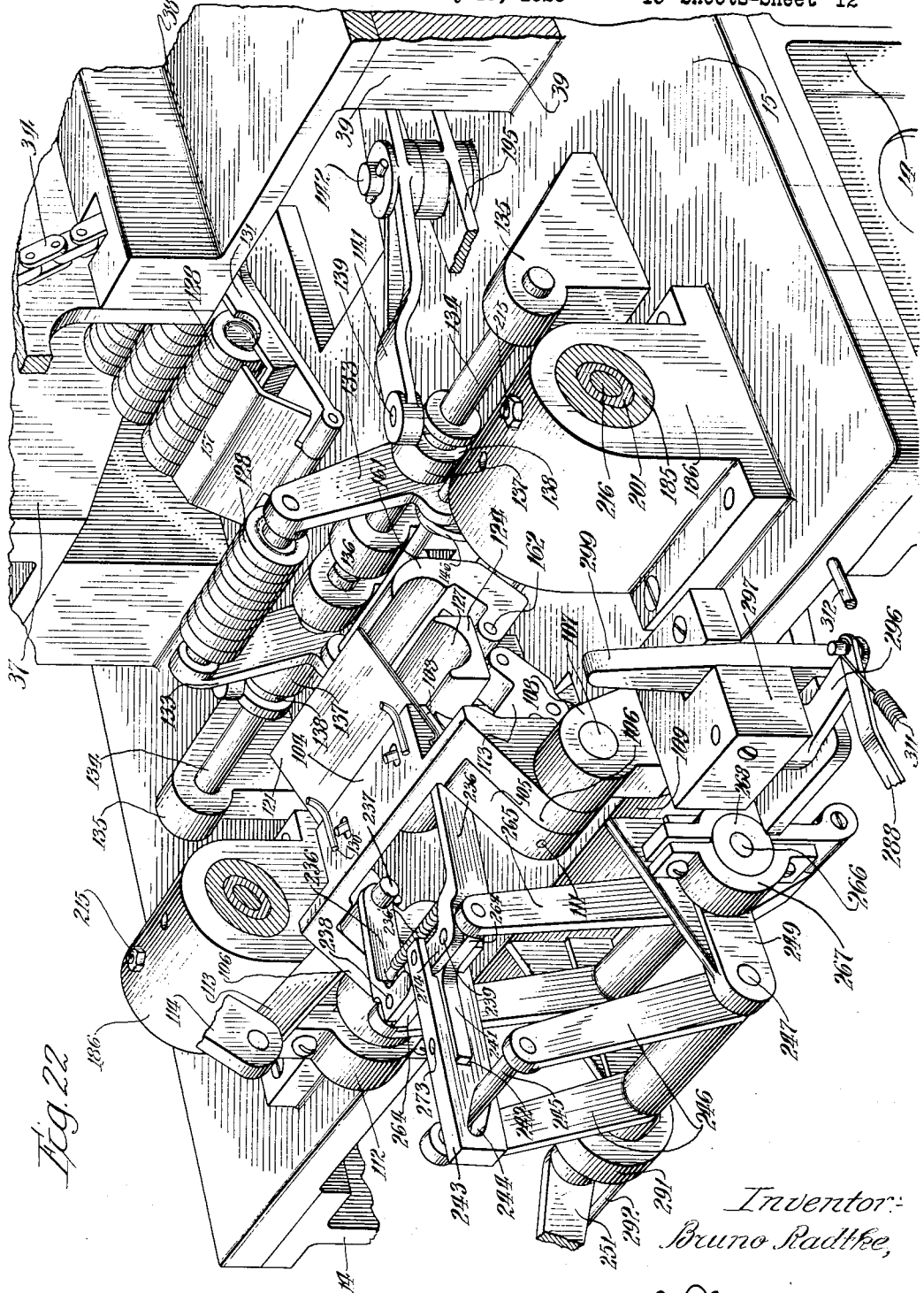

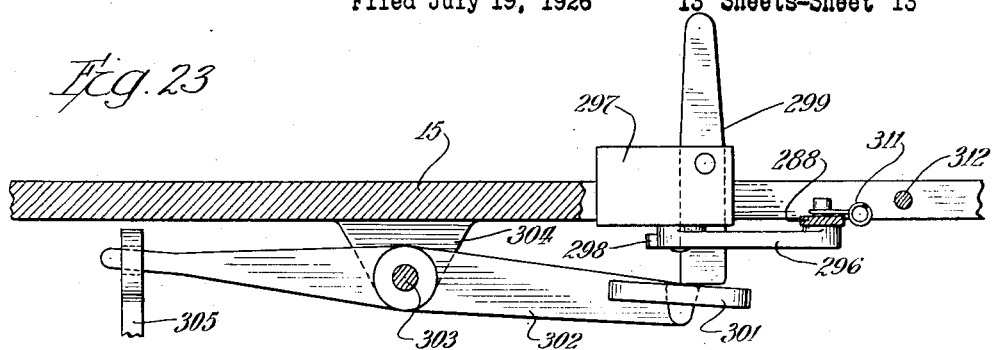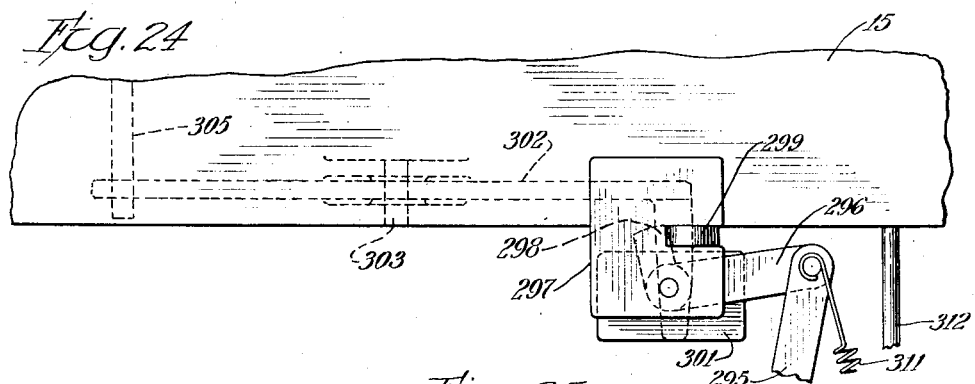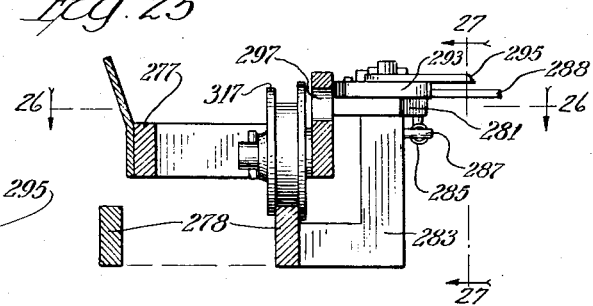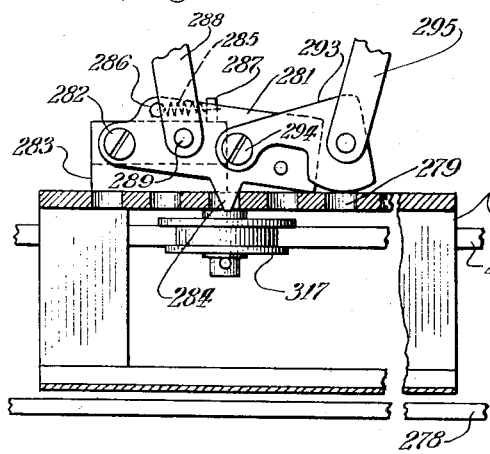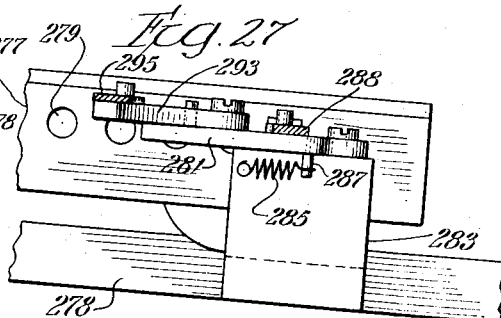

Patented Nov. 27, 1928.

1,693,403

UNITED STATES PATENT OFFICE.

BRUNO RADTKE, OF LIBERTYVILLE, ILLINOIS, ASSIGNOR TO MILLS NOVELTY COMPANY, OF CHICAGO, ILLINOIS, A CORPORATION OF ILLINOIS.

WRAPPING MACHINE.

Application filed July 19, 1926. Serial No. 123,443.

My invention relates to wrapping machines, the particular purpose of the machine shown in the drawings as an embodiment of the invention being to wrap candy, such as mints, or like articles, in packages which preferably are of suitable form and size to be dispensed through coin-operated vending machines.

While the machine of the invention, as will be apparent, is not in any sense limited to the wrapping of articles for vending machines, it has been designed, in part, with a view to overcoming certain difficulties which have been experienced in dispensing, through such vending machines, articles which have been wrapped by the machinery heretofore used for the purpose or by hand. It will be appreciated that in the case of mints, or like articles wrapped according to the accepted custom, that is, in rows, wrapped with a suitable foil or other material which extends beyond the ends of the rows and is twisted or otherwise closed, the dispensing of such packages through the passageways of vending machines would be seriously interfered with by irregular or projecting ends on the packages, or by loosening of such ends with resultant disarrangement and perhaps spilling out of the contents. In practice, this has frequently occurred and one of the most important features of the present invention is the provision of a wrapping machine which is adapted to close the ends of such packages tightly and permanently, and without leaving any projecting folds or irregularities which might interfere with the dispensing of said packages in the manner hereinbefore described.

In this connection, it may also be mentioned that the particularly effective instrumentalities provided by the invention for closing the ends of the packages render it possible to effect a very material economy in the wrappers employed. This operation has ordinarily been performed, when it has been done by machinery, by mechanism adapted to spin the ends of the wrapper and, in order to get satisfactory results with this method, it has been found necessary to use an unlined foil, which, since it comes in direct contact with the mints, or other articles of food, must be of such character as to avoid possibility of contamination. For this reason, the relatively expensive tin foil has ordinarily been employed, but, when the wrapping is performed by the machine of my invention, the considerably less expensive lead foil, with a wax paper lining (which would prevent effective closing of the ends of the wrapper by the spinning method) may be employed, the combined cost of the lead foil and lining being considerably less than the cost of the tin foil, and the wrapper thus made being in full compliance with the food laws.

A further object of the invention is the provision of full automatic mechanism for performing in suitably timed relation the several operations required for wrapping articles in packages of the type hereinabove referred to and the novelty of said mechanism resides in the general combinations, as well as the specific construction and principle of operation of certain elements to be hereinafter more particularly pointed out and claimed.

Numerous other objects and advantages of the invention will be apparent as it is better understood from the following description, which, taken in connection with the accompanying drawings, discloses a preferred embodiment thereof.

Referring to the drawings,

Figure 1 is a front elevation of a machine in which my invention is embodied;

Fig. 2 is a side elevation, looking toward the left in Fig. 1;

Fig. 3 is a rear elevation of the machine;

Fig. 4 is a top plan view;

Fig. 5 is a plan section, taken substantially on the plane 5—5 in Fig. 2;

Fig. 6 is a front-to-back section, taken substantially on the section line 6—6 in Fig. 3;

Fig. 7 is an enlarged detail of certain parts shown in Fig. 6;

Fig. 8 is a corresponding view, broken away somewhat more and showing a later stage of the operation;

Figs. 9 to 12, inclusive, are perspective views of the package, showing the several operations performed thereon by the machine;

Figs. 13, 14 and 15 are detail sectional views of the mechanism for closing the ends of the wrappers, said views illustrating the several stages of the operation;

Fig. 16 is a sectional view of one of the two opposed units of said mechanism, showing the manner in which the same is mounted and operated;

Fig. 17 is an elevational view of said unit, looking toward the right in Fig. 16;

Fig. 18 is a sectional view, taken substantially on the section line 18—18 of Fig. 16;

Fig. 19 is a perspective view of the barrel, or plunge member, of said mechanism;

Fig. 20 is a sectional view, showing in detail certain of the mechanism at the wrapping station and in particular the means for removing the completed package;

Fig. 21 is a sectional and plan view, taken substantially on the plane 21—21 in Fig. 20;

Fig. 22 is an enlarged perspective view, showing the wrapping station and mechanism associated therewith, certain parts being broken away for convenience in illustration;

Figs. 23 and 24 are sectional and plan views, showing the automatic clutch throw-out mechanism;

Fig. 25 is a detail sectional and elevational view of a part of said clutch throw-out mechanism and of the means for controlling the advance of a carriage adapted to carry a tray for receiving the packages as the same are discharged from the machine; and Figs. 26 and 27 are detail views, taken respectively along the lines 26—26 and 27—27 of Fig. 25.

Upon said drawings, illustrating the best manner in which I have thus far contemplated applying the principles of my invention, the reference character 11 indicates a table upon which the machine is adapted to be positioned and to which it is adapted to be secured by means of bolts 12, extending through flanges 13 of uprights 14 supporting the operating elements of said machine (see Figs. 1 to 3). A bed plate 15 is supported by said uprights, to which it is secured by means of bolts 16 (see Fig. 4). A power shaft 17 has bearings in the uprights 14 and carries at one end a pulley 18, adapted to be driven from any suitable source of power by means of a belt 19, a fly wheel 21 being carried at the opposite end of said shaft. Said shaft 17 carries a clutch 22 (see Fig. 3) and is geared to a cam shaft 23 by means of ring gears 24 and 25. Said cam shaft carries at its opposite ends miter gears 26 and 27, meshing with corresponding gears 28 and 29 secured respectively to vertical cam shafts 31 and 32 at the lower ends thereof. Said cam shaft 23 carries a sprocket 33, connected by a chain 34 with a sprocket 35 on a transverse shaft 36 (see Figs. 2 to 4, inclusive), said shaft 36 being journaled in side plates 37 extending upwardly from brackets 38, in turn supported by uprights 39 extending upwardly from the bed plate 15.

Referring now particularly to Figs. 2 and 6, the wrapper feeding and cut-off mechanism will be described. A roll 41 of wrapping material, in the present instance lead foil with a wax paper lining, is supported from the upper ends of the side plates 37, which are formed with U-shaped recesses 42 for the reception of studs 43 projecting laterally from a spool 44 upon which the wrapping material is wound. The web 45 from said roll 41 is directed over a tensioning roller 46, carried by a yoke 47, which is pivoted to the plates 37 at 48 and has a lower extension 49 connected by a spring 51 to said plate 37, whereby the tensioning roller is yieldingly held in extended position and adapted to take up sudden jerks or pulls on the web which might otherwise tend to sever the latter and necessitate stopping the machine. The web is directed from the tensioning roller over a guide plate 52 and between feeding rollers 53 and 54, mounted upon cross shafts 55 and 56, which carry at their outer ends intermeshing gears 57 and 58. The gear 57 is adapted to be intermittently driven by means of a ratchet mechanism, shown clearly in Fig. 2 and comprising a ratchet wheel 59, rigid with the gear 57, a pawl 61, pivoted at 62 to one corner of a plate 63, pivoted to one of the side plates 37 at 63' and connected by a link 64 with a crank arm 65, carried by the shaft 36, the pawl 61 being held in engagement with the ratchet wheel by means of a spring 66 connected to the lower end of said pawl and to the plate 63. It will be apparent that by means of the mechanism just described, constant rotation of the shaft 36 will impart an intermittent or step motion to the gear 57, and consequently to the feed rollers 53 and 54. Beyond said rollers 53 and 54, the web is threaded between guide members 67 and 68, the latter being pivoted at 69 to a frame part 71, which is slotted as indicated at 72 to permit relative movement of the member 68 with respect to the member 67 (see Fig. 7). Said member 68 rests upon the member 67 and on the web 45 merely by its own weight and, when turned back, permits the web to be readily threaded between said members and between the knives to be presently described. The shaft 56, carrying the roller 54 and gear 58, is journaled in a bracket 73, which is carried upon a yoke 74, pivoted at 75 to the upper ends of the plates 37, whereby said roller and associated mechanism are movable bodily outwardly and upwardly about the pivot 75 to facilitate the positioning of the roll 41, which may then be inserted from the front. A latch member 76 is pivoted to the yoke 74 near the lower end of a central member 70 thereof and is adapted to automatically engage a cross pin 77, mounted in forward projections 80 on the frame, when the parts are returned to normal position, such automatic engagement being effected by means of a spring 78, connected with the yoke 74 and the inner end of the latch member 76, the latter being limited in its movement under spring tension by a pin 79 and being cut away at the inner end to cause it to ride over the pin 77 when said yoke 74 is brought down to the position shown in the drawings.

A spring-pressed wiper and friction pad 81 is carried by the bracket 73, being urged against the roller 54 by means of a spring 82, mounted on a shank 83 of a pad holder 84, said pad serving to wipe off the wax which may accumulate upon the roller 54 by reason of its contact with the wax paper lining of the web 45 and also to provide friction upon said roller 54, thereby assisting in the feeding action. Suitable lengths of the web are adapted to be cut off by means of a cutter bar 85 and co-acting edge block 86, the latter being inset in the lower side of the member 67 and the former being pivoted at 87 to said block and being adapted to be actuated by mechanism shown most clearly in Fig. 2.

A bellcrank lever 89 is pivoted at 91 to the upper part of the side plate 37 and the lower arm 92 thereof is connected at 93 with a link 94 connected by a vertical pivot 95 with a jointed link 96, pivotally connected at 97 to the outer end of the bar 85. The upper arm 98 carries a roller 99, riding upon a cam 101 carried by the shaft 36 near the outer end thereof. Said knife is normally held in the outer position by means of a spring 102 connected at its opposite ends to a pin 100 on the link 96 and to the bar 77 (see Fig. 2), said spring serving to hold the roller 99 in contact with the cam 101. The form of said cam is such as to cause the cutter bar 85 to periodically cut off a wrapper of suitable length from the web 45, said wrapper being received by a transfer mechanism, which will next be described, reference being had, in this connection, particularly to Figs. 2, 6, 7, 8, 20 and 22.

Opposed jaw members 103 and 104 are mounted on a horizontal axis, the form of said members being clearly shown in Fig. 22, from which it will appear that they are bifurcated, the opposite sections 105 and 106 thereof being mounted upon short shafts 107, journaled in uprights 108 extending upwardly from a forward bracket 109 on the frame (see Fig. 7). The upper jaw member 104 is loose on said shafts 107 and the lower jaw member is secured to said shafts, as indicated at 111 in Fig. 22. Friction is provided upon one of said shafts by means of a friction collar 112, this being for the purpose of providing for relative movement between the jaws, it being evident that the jaw 103 will have a tendency to remain in any position assumed until positively moved therefrom. The jaw member 104 is connected by a link 113 with a lever 114, which is pivoted to a second lever 114', which in turn is pivoted to the frame plate 37 at 115 and adapted to be actuated by means of a cam lever 116, pivoted at 115 and carrying a cam roller 117, riding upon a cam 118 on the shaft 36 (see Fig. 4), said roller being held in contact with said cam by means of a spring 119 secured at its upper end to the rear end of the lever 116 and at its lower end to the frame bracket 38 (see Fig. 3). The levers 114 and 114' are yieldingly connected near their lower ends by means of a spring 110, connected at one end to the lever 114 and at the other end to a pin 110' projecting from the lever 114', this connection permitting the parts to yield and thereby prevent breakage or distortion in case of a jam.

Through the described mechanism, the jaw member 104 is adapted to be periodically raised and lowered and the lower jaw moved therewith when the jaws are in fully closed or fully open relationship. In the upper position, said jaws are in open relationship (see Fig. 20) and adapted to receive a wrapper 121 as the same is cut off from the web 45 and arranged between said jaws, a stop and guide pin 120 being provided to prevent said wrapper from entering too far between the jaws and to hold said jaws in proper relative position, said pin being of arcuate form and being secured to the lower jaw, from which it extends upwardly through a slot 130 in the upper jaw. Said jaw 103 is formed with a shoulder 122, which partially forms said wrapper by bending the edge upwardly, as shown in Fig. 22, as manifestly will occur when said wrapper is inserted to the full extent between the jaws and the latter are closed together. A lip, or guard, 123 is provided on the upper jaw 104.

After the wrapper has been placed upon the lower jaw, as just described, the upper jaw is moved downwardly by the link 113 and levers 114 and 114' until it is brought against the lower jaw, as indicated in Fig. 22, thus gripping the edge of the wrapper 121, continued movement then forcing the lower jaw downwardly until the wrapper is arranged in position above a block 124, which is flanged at the bottom as indicated at 125 and secured to the bed plate 15 by means of screws 126 extending through flanges 125 (see Fig. 7). Said block 124 has a concavity 127 formed in the top thereof, of proper size to receive the articles to be wrapped, in the present instance mints or like candy, indicated by the reference character 128, the same being adapted to be deposited upon the wrapper 121 after the latter has been arranged upon said block and as it is being released by the jaws 103, 104. Said jaws are opened to release the wrapper upon the upward reciprocation of the link 113 and levers 114 and 114', it being evident that on account of the loose mounting of the member 104, 106, the latter will be moved away from the member 103, 105 before said last-mentioned member is moved upwardly, such upward movement of the jaw 103 being effected by means of a pin 129 on the part 106 of the upper member. After the transfer mechanism has been brought to the full up position, the web is fed forward through the intermittently actuated feed rolls heretofore described and another wrapper is cut off and placed between the jaws 103, 104, whereupon the cycle of operation of the latter is repeated.

As the wrapper is positioned upon the block 124, a row of mints 128 is transferred from a tray 131, which is positioned upon a supporting plate 132 projecting rearwardly from the frame. The mechanism for performing this operation will now be described, reference being had particularly to Figs. 5, 7, 8 and 20 to 22, inclusive.

Opposed arms 133 are mounted upon shafts 134 having bearings 135 and 136 extended upwardly from the plate 15, the rear ends of said arms being formed as collars 137, slidable upon said shafts 134 and being grooved as indicated at 138 for the reception of studs 139 carried in the ends of actuating levers 141, which are centrally pivoted upon vertical studs 142 arising from the plate 15. The rear ends of said levers 141 are provided with cam rollers 143, riding upon cams 144 upon the vertical cam shafts 31 and 32, the form of said cams being such as to reciprocate the arms 133 upon the shafts 134, causing them to grip the front row of mints in the tray 131 when in the rear position and to release the same when in the forward position, i. e., above the block 124, rocking motion being imparted to said arms in manner which will presently be described. Springs 150 are connected to the forward ends of said levers 141 and to the plate 15 and serve to hold the rollers 143 in contact with the cams 144, as clearly shown in Fig. 5. Said arms 133 are connected by links 146 with a lever 147, pivoted at 148 to a downward projection 149 beneath the bed plate 15, said links being held in parallel relationship by a cross bar 151 and said arms 133 being connected to the links 146 by means of an elongated pivot rod 140 (see Fig. 21), the connection thus permitting relative movement of said arms 133 longitudinally of the shaft 134. The lever 147 is rocked by means of an arm 152, rigid therewith and extending beyond the pivot 148, said arm carrying a cam following roller 153 engaging a cam 154 on the cam shaft 23 (see Fig. 6). A spring 155, connected with a pin 155' extending between the links 146, tends to hold the lever 147 in down position and the roller 153 in contact with said cam 154, said spring being connected at its lower end to a rod 156 extending between said plates or uprights 14. It will be apparent from the foregoing that said arms 133 are given both rocking and reciprocating movement, so timed as to cause them to grip a row of mints when in the rear position and to release it in the forward position, in manner which will be readily understood.

For the purpose of preventing disarrangement of the mints 128 as the same are removed from the tray 131, I provide a spring lip 157, pivotally mounted at the forward end of the support 132 and normally held in the position shown in Fig. 7 of the drawings by means of a spring 158, connected thereto and to a pin 159 projecting downwardly from the bottom of said supporting member 132. This lip exerts a yielding pressure against the mints as the same are lifted out of the tray and it will be evident that this device prevents the striking of said mints against a rigid part, such as the forward wall of the tray, as might readily occur without it.

The mints having been placed upon the wrapper positioned upon the block 124, the next operation is the wrapping thereof and the mechanism for performing the first stages of this operation will now be described, reference being had especially to Figs. 6, 7, 8, 20 and 22.

A jaw member 161 is pivoted at 162 to the block 124 and is provided with a rearward extension 163, pivoted at 164 to a connecting rod 165, pivotally connected at its lower end to a lever 166, which is pivoted on the shaft 148 and has a rearward extension 167, carrying a cam roller 168 held in contact with a cam 169 on the cam shaft 23. A spring 171 is mounted on the rod 165 and is compressible between the bottom of the bed plate 15 and a shoulder 172 on the lower end of said rod, said spring being compressed when the jaw 161 is closed, thereby steadying the action, and expanding when the jaw is to be opened, thereby assisting in effecting the opening movement. A spring 170, connected to said lever 166 and to the cross rod 156, tends to hold said lever depressed and the roll 168 in contact with the cam 169 (see Fig. 3). The form of said cam 169 is such as to first bring the jaw 161 into the position shown in Fig. 6, after which it is removed, as shown in Fig. 7, to permit operation of a co-acting jaw 173, the action of which will be presently described, said jaw 161 being then again brought into action, as shown in Fig. 8, before final separation of said jaws, as shown in Fig. 20, to permit removal of the package. The initial operation of the jaw 161 is illustrated in Fig. 9. Said jaw 173 is actuated by means of a connecting rod 174, pivoted at 175 to a projection 176 on said jaw, the latter being pivoted at 177 to the block 124, as clearly shown in Fig. 2. A spring 178 is mounted on said rod 174 in the manner of the spring 171 on the rod 165 and said rod 174 is connected at its lower end with a lever 179, which is pivoted at 181 to the frame and has a rearward extension 182 carrying a roller 183 riding upon a cam 184 carried by the cam shaft 23 (see Figs. 2 and 3). A spring 180, connected to said lever 179 and to the rod 156, serves to hold said lever in the down position and to hold the roller 183 in contact with the cam 184 (see Fig. 3). The action of said jaw 173 is indicated in Figs. 6, 7, 8 and 20. As previously stated, the jaw 161 is brought into action a second time upon each wrapping operation, the final relation with the jaw 173 being shown in Fig. 8. The wrapper is thus arranged as shown in Fig. 10 of the drawings and the next operation thereon is the closing of the ends, as shown in Figs. 11 and 12. This is accomplished by mechanism which may be clearly understood from an inspection of Figs. 5 and 13 to 19, inclusive, to which attention is now directed.

Co-acting reciprocating devices are positioned at the opposite ends of the block 124 in spaced relation thereto, said devices each comprising a plunger 185, slidably mounted within bearing members 186 secured to the plate 15, said plungers having a plurality of fingers 187 pivotally secured to projections 188 formed in pairs at the forward end thereof. Said fingers are of bellcrank formation, having laterally extending portions 189 disposed within an interior groove 191 formed in a collar 192, slidably mounted upon the plunger 185 and having an exterior circumferential groove 193, in which is disposed a head 194 on a lever 195, pivoted on the vertical shaft 142 and having a rearward extension 196, carrying a roller 197, contacting with a cam 198 on the vertical cam shaft 31, 32, a spring 199 being connected to said lever extension 196 and adapted to hold said roller 197 in contact with said cam 198. A sleeve 201 is slidably mounted within the plunger 185 and a rod 202 is mounted for limited sliding movement within said sleeve, a collar 203 being positioned upon the rear end of said rod 202 and provided with a groove 204 in which is disposed a stud 205, carried at the forward end of a lever 206, which is pivoted to a stud 207, projecting upwardly from a standard 208, said lever having a rearward projection 209, carrying a cam following roller 211 contacting with a cam 212 on the vertical cam shaft 31, 32, the opposed lever extensions 209 being drawn towards each other by a spring 213 connected at its opposite ends with arms 214, rigid with said lever extensions 209. The plunger 185 is held against rotation by means of a screw 215, extending through the top of the member 186 and into a slot 216 in said plunger, the rear end of the plunger being threaded, as indicated at 217, and adapted to have a collar 218 screwed thereon and secured in desired position by means of set screws 219. The sleeve 201 is also threaded at its rear end, as indicated at 221, and adapted to have a collar 222 screwed thereon, the rear end of the plunger 185 being cut out, as indicated at 223, to receive said collar 222 and a spring 224, which is compressible between said collar and shoulder 225 in the plunger 185. A spring 226 is mounted on the rod 202 between the collars 222 and 203 and said rod is guided and limited in its relative reciprocatory movement by means of a pin 227, projecting therefrom and taking into a slot 228 in the sleeve 201. A spring 229 is positioned within the collar 203, which is closed at one end, as indicated at 231, said spring being compressible between said end 231 and the outer end of the rod 202, the latter having a pin 232 projecting therefrom and taking into a slot 233 in said collar 203.

The operation of said reciprocating devices will be clear from the foregoing description and the steps thereof are each illustrated in detail in Figs. 13 to 16, inclusive. In the retracted position, the parts are arranged as indicated in Fig. 16. The levers 195 and 206 are then actuated to move the entire assembly inwardly, enough relative movement being permitted between said plunger and collar to open the fingers 187, in the manner indicated in Fig. 13. Said collar 192 is then slightly advanced on the plunger 185 and the fingers 187, which are arranged in concentric relationship, are moved inwardly, as indicated in Fig. 14, arranging the end of the wrapper in the condition shown in Fig. 11. Said collar 192 is then moved in the opposite direction upon the plunger 185 to open the fingers 187, as shown in Fig. 15, and the sleeve 201 is moved inwardly, the collar 218 having at this time been brought into contact with the outer end of the bearing member 186, the further advance of the sleeve 201 being permitted by compression of the spring 224. The inner end of said sleeve 201 is flanged, as indicated at 234, and its outer surface is concave, as indicated at 235. This surface acting upon the ends of the wrapper forces the end of the wrapper inwardly against the outermost mint 128 in the row being wrapped. When the opposed sleeves 201 have moved inwardly as far as permitted by the candy, the rod 202 is further advanced, this being permitted by compression of the spring 226, and the wrapper ends are tightly pressed against and caused to conform to the shape of the end mints, the final condition of said wrapper being clearly illustrated in Fig. 12. It will be evident that with this mechanism the wrapper ends are tightly interfolded and pressed into the depressions in the mints, so that there are no irregular projecting portions and said ends will permanently remain in the condition in which they are arranged by the machine. As hereinbefore explained, this is highly advantageous when the packages are to be dispensed through a vending machine and, obviously, is beneficial in any event as the packages thus formed are compact and firm so that they may be readily handled and the contents are protected in the manner intended. After the final operation on the wrapper, the devices just described are returned to the position shown in Fig. 16, the fingers being moved at the end of the stroke from the distended position shown in Fig. 15 to the retracted position shown in Fig. 16, thus providing clearance for the mechanism employed for removing the package from the block 124, which mechanism will next be described.

Attention is now directed to Figs. 1 and 20 to 22, inclusive, which perhaps best illustrate the package removing mechanism, which comprises a pair of pivoted arms 236, connected together by a spring 236' and having inwardly extending studs 237 on the inner ends thereof and being adapted to be actuated to grip the ends of the package, lift and carry said package to a point of discharge and then release the same in accordance with a cycle of operation which will presently become apparent. Said arms 236 are pivoted respectively at 238 and 239 to a plate 241, which is slidably mounted in a slot 242 in a bar 243, which is provided with an inclined slot 244 at the rear end thereof and is supported by a rod 245 disposed within said slot and carried by spaced arms 246, carried upon a shaft 247 journaled in forward extension 249 of the bracket 109. Said shaft 247 is given rocking motion by means of a link 251, secured to the end thereof and connected with a connecting rod 252, which carries a spring 253 between a lower shoulder 254 and a sleeve 255 into which said rod extends, the upper end of the rod carrying a laterally projecting pin 256 disposed in a slot 257 in said sleeve 255. This yielding connection takes up any shocks or jars which might result from obstruction of the parts actuated by said rod 252 and associated mechanism. The upper end of the member 255 is pivoted at 258 to a lever 259 (see Fig. 4), said lever being pivoted on a rod 261 projecting from an upper part of the frame and carrying a cam following roller 262 riding upon a cam 263 carried by the cam shaft 36.

Reverting now to Fig. 22, it will be observed that the plate 241 has laterally projecting arms 264, which are secured to upright arms 265 disposed inwardly from the arms 246 and carried by a shaft 266 journaled in the bracket extensions 249, a friction collar 267 being positioned upon a collar 268 fast with said shaft 266 and said arms 265. Said shaft 266, being idly mounted, is adapted to be rocked through the arms 265 and the friction provided by said collar 267 serves to hold said arms in any position assumed until positively moved therefrom by action of the mechanism with which they are connected. Said plate 241 is slotted at 269 and 271, as clearly shown in Fig. 20, and is held within the bar 243 by means of pins 272 and 273 extending through said slots. The arms 236 have lateral projections 274, the projection of one arm being above and that of the other being below the plate 241, and the inner ends of said projections are pivoted on the pin 272. It will now be apparent that movement of the bar 243 under rocking motion imparted through the arms 246 will cause the arms 236 to turn on their pivots 238, 239, thus moving the free ends of said arms toward or from each other, for the purpose of gripping and releasing the packages, which I have indicated by the reference character 275. As shown in Fig. 22 and in Fig. 8, the arms 236 are in separated relationship and ready to be moved inwardly to grasp a package 275. Actuation of the shaft 247 in clockwise direction, viewing Fig. 22, then moves said arms to position with the studs 237 at the opposite ends of said package. The initial reverse movement of the shaft 247 then causes the bar 243 to move relatively to the plate 241, thereby turning the arms 236 on their pivots and causing them to grip the ends of the package, the relation of the parts during this part of the operation being shown in Fig. 20. Continued movement in the same direction causes the arms 236 to be lifted, this being accomplished by the action of the pin 245 in the inclined slot 244 and resulting in clearing the package from the block 124 and the jaw 173. The package is held during the remainder of the forward motion of the mechanism under consideration and at the end of the stroke there is a sudden reverse, tending to separate said arms 236 to permit release of said package, this motion also serving another purpose, which will later be described. The package falls into a chute 276 at the front of the machine, which is of such form as to turn said package in endwise direction and to direct the same into a tray 131 arranged in inclined position upon a carriage 277, movably mounted upon inclined tracks 278 supported from the table 11.

Said carriage 277 is adapted to be moved by gravity along said tracks 278 with a step motion, the mechanism for controlling said motion being shown in detail in Figs. 5 and 23 to 27, inclusive. The upper side of the carriage 277 is formed with a series of apertures 279 and a pawl 281 is mounted adjacent the carriage position, being pivoted at 282 upon a bracket 283 projecting from the inner track 278. Said pawl has a projection 284 adapted to extend into one of the apertures 279, being urged to this position by means of a spring 285, connected at 286 with the pawl and to a pin 287 on the bracket 283. Said pawl is adapted to be intermittently actuated to withdraw the projection 284 from said aperture 279. After a package 273 has been positioned in the tray 131 on the carriage 277, the carriage is permitted, through this mechanism, to advance one step, so as to be in position to permit the positioning of a second package on the tray immediately behind the first one, the pawl, after being momentarily withdrawn, being immediately released and entering the next following aperture 279, toward which it is urged by the spring 285. The mechanism for controlling said pawl 281 comprises a bar 288, pivotally connected at 289 to the pawl and connected at its opposite end to a collar 291, loosely mounted on the shaft 247. Said collar carries a laterally projecting pin 292, disposed beneath the link 251, which impinges momentarily thereagainst in the sudden reverse action occurring at the end of the outward movement of the bar 243, this operation having been hereinbefore referred to in connection with the release of the packages 275 by the arms 236. Inasmuch as said link is immediately moved away after striking the pin 292, the spring 285 is permitted to restore the pawl 281 and consequently said collar 291 to the initial position in which the carriage is held in adjusted position until the next package has been deposited on the tray.

I provide means for automatically stopping the operation of the machine after the tray carried by the carriage 277 has been completely filled, this mechanism comprising an angular member 293, pivoted at 294 to the pawl 281 and connected by a bar 295 to a lever 296, pivoted on the inside of a plate 297 projecting from the bed plate 15. Said lever is rigid with an arm 298 arranged behind a pivoted lever 299, the lower end of which is normally in contact with a pedal 301, which is carried by a bar 302 pivoted at 303 to a projection 304 depending from the bed plate 15, the opposite end of said bar being connected with a bar 305 extending rearwardly beneath said bed plate and having a beveled portion 306 at the rear end thereof adapted to act upon a pawl 307 associated with the clutch mechanism 22 on the shaft 17 to thereby disconnect said clutch and stop the operation of the machine (see Fig. 3). A spring 308 tends to pull down the end of said bar 305, which is pivoted at 148 (see Fig. 6), said spring being connected at its lower end to the rod 156. The rear end of said bar 305 is normally held in raised position by means of the lever 299 when the lower end thereof is arranged upon the pedal 301, but when the carriage 277 is advanced to the position shown in Fig. 5, the rear portion 309 of the member 293 rides over the end of said carriage and the bar 295 is moved forwardly by means of a spring 311, connected to the rear end of said bar and to a pin 312 projecting from beneath the plate 15. This obviously causes the arm 298, associated with the lever 296, to knock out the lower end of the lever 299, thereby permitting the pedal 301 to rise under the influence of the spring 308 acting upon the bar 305. The rear end of said bar 305 is disposed in a guard 305', positioned upon a cross rod 306' extending between the uprights 14. The clutch may be engaged by manual depression of the pedal 301 and it will be observed from Fig. 23 that the lever 299 is extended upwardly above the plate 15 so that the clutch may be manually thrown out, if desired.

The track 278 is supported from the table 11 by means of angular members 314, 315, 316 and the carriage 277 is supported upon the track 278 by means of rollers 317 and 318, there being two of the rollers 317 on the inner side of the carriage and, in the present instance, but one roller 318 on the outer side thereof.

Inasmuch as the machine has been described in the order of the successive steps of the operation, it is thought that an extended description of the operation, as such, will not be necessary and it is believed that the following brief review will suffice to give a clear understanding thereof.

The mints 128 having been arranged upon the tray 131 in any desired manner, said tray may be positioned upon the support 132 either by hand or mechanically, it being evident, of course, that the mints, or other articles to be wrapped, might be supplied to the machine in other manner if desired and that the machine might be placed in line with feeding, sorting, or other mechanism, in accordance with factory conditions.

The machine may then be started by operation of the lever 299, or pedal 301, permitting the clutch 22 to become engaged, the engagement being effected by a spring mechanism (not shown). The web 45 is fed downwardly from the roll 41 and a wrapper 121 is cut off by the action of the knives 85, 86. Said wrapper is received between the jaws 103, 104, which close together and move downwardly, opening on the initial reverse movement to deposit the wrapper upon the block 124, the mints being at this time deposited upon said wrapper by the action of the arms 133. The jaw 161 then moves inwardly to the position shown in Fig. 6 and recedes while the jaw 173 moves inwardly to the position shown in Fig. 7. The jaw 161 now moves in again to the position shown in Fig. 8, in which the wrapper is tightly clamped around the mints, as shown in Fig. 10.

The reciprocating end closing devices carried by the plungers 185 then move inwardly, first crushing the ends of the wrapper, with the result illustrated in Fig. 11, and thereafter pressing said ends against the contents of the package, the final condition of which is illustrated in Figs. 12 and 15. Said reciprocating devices recede to the position shown in Fig. 21 of the drawings and the arms 236 grasp the completed package 275, carrying the same forwardly and releasing it into the chute 276, which is inclined downwardly and narrowed towards its ends, the walls being so arranged as to turn the package endwise and direct it into the tray 131 arranged in inclined position upon the carriage 277. The pawl 281 is then actuated to permit said carriage to move one step forward, thereby arranging the tray in position to receive the next package immediately behind the one last positioned therein. This operation continues until the tray is filled when the clutch 22 is automatically thrown out by means of the mechanism controlled by the member 293 as the latter rides over the rear end of the carriage (see Fig. 5). The carriage may then be restored to the up position shown in Fig. 4 and an empty tray positioned thereon, after which the machine may again be started, it being understood, of course, that the removal of the trays or individual packages of candy might be effected by automatic machinery and that, in any event, the delivery or feeding of the candy into the machine, as well as the removal of the wrapped packages, may be so timed as to provide for substantially continuous operation of the machine. While I have illustrated a machine particularly adapted for the wrapping of candy arranged in rows of separate circular pieces with concave sides, it is evident that the invention is adapted for embodiment in machines particularly designed for the wrapping of other articles, either singly or in grouped relation, and that such articles may be of a wide variety of sizes and configurations.

It is thought that the invention and many of its attendant advantages will be understood from the foregoing description, and it will be apparent that various changes may be made in the form, construction and arrangement of the parts without departing from the spirit or scope of the invention, or sacrificing all its material advantages, the form hereinbefore described being merely a preferred embodiment thereof.

I claim:

1. A wrapping machine, comprising a support for the articles to be wrapped, means for positioning wrappers upon said support, means operating in timed relation to said last-mentioned means for depositing the articles to be wrapped upon said wrappers, means for folding the wrappers around said articles, and means for closing the packages thus formed including devices acting upon the ends of the wrappers in axial direction to tightly close said ends against the contents of the package, said last-mentioned means comprising successively acting closing elements movable as a unit toward and from the package.

2. A wrapping machine, comprising a support for the articles to be wrapped, means for positioning wrappers upon said support, means operating in timed relation to said last-mentioned means for depositing the articles to be wrapped upon said wrappers, means for folding the wrappers around said articles, means for closing the packages thus formed including devices acting upon the ends of the wrappers in axial direction to tightly close said ends against the contents of the package, said last-mentioned means comprising successively acting closing elements movable as a unit toward and from the package, and means for removing the completed packages from said support.

3. A wrapping machine, comprising a support for the articles to be wrapped, means for positioning wrappers upon said support, means operating in timed relation to said last-mentioned means for depositing the articles to be wrapped upon said wrappers, means for folding the wrappers around said articles, means for closing the packages thus formed, means for removing the completed packages from said support, a receptacle in which said packages are adapted to be deposited, and means for intermittently adjusting the position of said receptacle to permit arrangement of the packages therein in predetermined relation.

4. A wrapping machine, comprising a support for the articles to be wrapped, means for positioning wrappers upon said support, means operating in timed relation to said last-mentioned means for depositing the articles to be wrapped upon said wrappers, means for folding the wrappers around said articles, means for closing the packages thus formed, means for removing the completed packages from said support, a receptacle in which said packages are adapted to be deposited, means for intermittently adjusting the position of said receptacle to permit arrangement of the packages therein in predetermined relation, and means for automatically stopping the operation of the machine when said receptacle is filled.

5. A wrapping machine, comprising a support for the articles to be wrapped, means for supplying wrapping material to the machine, means for cutting said material into desired lengths to form wrappers, means for placing said wrappers successively on said support, means for depositing the articles to be wrapped upon said wrappers, coacting jaw members for wrapping said wrappers about said articles, horizontally reciprocating devices for closing the wrapper ends, and means for removing the completed packages from said support.

6. A wrapping machine, comprising a support for the articles to be wrapped, means for supplying wrapping material to the machine, means for cutting said material into desired lengths to form wrappers, means for placing said wrappers successively on said support, means for depositing the articles to be wrapped upon said wrappers, coacting jaw members for wrapping said wrappers about said articles, reciprocatory devices for closing the wrapper ends, means for removing the completed packages from said support, and an automatically shiftable receptacle for receiving said packages in predetermined relationship.

7. A wrapping machine, comprising a support having a concave upper surface adapted to receive a row of separate pieces of candy, means for intermittently arranging wrappers upon said support, means for arranging the candy to be wrapped upon said wrappers as they are placed, coacting jaw members for wrapping said wrappers about said candy, horizontally reciprocating devices for closing the wrapper ends to form a tight package, and means for removing the completed packages from said support.

8. A wrapping machine, comprising a support for the articles to be wrapped, means for folding a wrapper about said articles, and means operating axially of the package thus formed for closing the end of said wrapper, said last-mentioned means including a compressor member having a convex end portion adapted to compact the ends of the wrapper against a concave surface of the contents of the package.

9. A wrapping machine, comprising a support for the articles to be wrapped, means for folding a wrapper about said articles, and means operating axially of the package thus formed for closing the end of said wrapper, said last-mentioned means including means for preliminarily crushing the portion of the wrapper beyond the extremity of the package contents and means for pressing the crushed portion of the wrapper against said contents.

10. A wrapping machine, comprising a support for the articles to be wrapped, means for folding a wrapper about said articles, and means operating axially of the package thus formed for closing the end of said wrapper, said last-mentioned means comprising concentric relatively movable reciprocating members for performing successive operations upon said wrapper ends.

11. A wrapping machine, comprising a support for the articles to be wrapped, means for folding a wrapper about said articles, and means operating axially of the package thus formed for closing the end of said wrapper, said last-mentioned means comprising concentric relatively movable reciprocating members for performing successive operations upon said wrapper ends and a plurality of fingers pivotally mounted on one of said members and movable angularly with respect to the end of the package for crushing said wrapper end towards the axial center of the package as a preliminary step in the closing operation.

12. A wrapping machine, comprising a support for the articles to be wrapped, means for arranging wrappers on said support, means for arranging the articles to be wrapped upon said wrappers, and means for forming the package including opposed plungers consisting of relatively slidable parts adapted to perform successive operations upon the wrapper ends in closing the same to complete the package.

13. A wrapping machine, comprising a support for the articles to be wrapped, means for arranging the articles upon a wrapper positioned upon said support, means for folding the wrapper about said articles, and means for closing the ends of the wrapper to form a tightly wrapped package, said means including relatively movable members, a plurality of fingers pivotally mounted on one of said members and adapted to be actuated by another thereof to cause them to close upon and crush said wrapper ends.

14. A wrapping machine, comprising a support for the articles to be wrapped, means for arranging the articles upon a wrapper positioned upon said support, means for folding the wrapper about said articles, and means mounted at each end of the support for closing the ends of the wrapper to form a tightly wrapped package, said means including relatively movable members, a plurality of fingers pivotally mounted on one of said members and adapted to be actuated by another thereof to cause them to close upon and crush said wrapper ends.

15. A wrapping machine, comprising a support for the articles to be wrapped, means for arranging the articles upon a wrapper positioned upon said support, means for folding the wrapper about said articles, and means for closing the ends of the wrapper to form a tightly wrapped package, said means including relatively movable members, a plurality of fingers pivotally mounted on one of said members and adapted to be actuated by another thereof to cause them to close upon and crush said wrapper ends and means for further pressing said wrapper ends to produce even and firm ends upon the package.

16. A wrapping machine, comprising a support for the articles to be wrapped, means for arranging the articles upon a wrapper positioned upon said support, means for folding the wrapper about said articles, and means for closing the ends of the wrapper to form a tightly wrapped package, said means including a plurality of concentric plungers adapted to successively act upon said wrapper ends to fold and press the same against the contents of the package.

17. A wrapping machine, comprising a support for the articles to be wrapped, means for arranging the articles upon a wrapper positioned upon said support, means for folding the wrapper about said articles, and means for closing the ends of the wrapper to form a tightly wrapped package, said means including a plurality of concentric plungers adapted to successively act upon said wrapper ends to fold and press the same against the contents of the package, the latter having a concavity disposed at the end thereof and one of said plungers being adapted to press the wrapper end into said concavity.

18. A wrapping machine, comprising a support for the articles to be wrapped, means for arranging the articles upon a wrapper positioned upon said support, means for folding the wrapper about said articles, and means for closing the ends of the wrapper to form a tightly wrapped package, said means including a plurality of concentric plungers adapted to successively act upon said wrapper ends to fold and press the same against the contents of the package, actuating means for said plungers and springs interposed between the successively acting plungers.

19. A wrapping machine, comprising a support for the articles to be wrapped, means for arranging the articles upon a wrapper positioned upon said support, means for folding the wrapper about said articles, and means for closing the ends of the wrapper to form a tightly wrapped package, said means including relatively movable members, a plurality of fingers pivotally mounted on one of said members and adapted to be actuated by another thereof to cause them to close upon and crush said wrapper ends, means for further pressing said wrapper ends to produce even and firm ends upon the package and separate actuating means for said finger carrying and actuating members.

20. A wrapping machine, comprising a support for the articles to be wrapped, a source of supply of said articles including an inclined chute flanged at the front and a yieldable lip extending over the front flange of said chute and against which the articles are adapted to rest just prior to removal, means for lifting said articles away from the front end of said chute, means for wrapping said articles, and mean for removing the package thus formed from said support.

21. A wrapping machine, comprising a wrapping station, means for delivering wrappers to said station, means for delivering the articles to be wrapped to said station, means for wrapping said articles, and means for removing the completed packages from said station, said means including a pair of arms having angular extensions, separate members to each of which said extensions are pivoted, said members having a rocking motion part of which is in unison and part relative whereby said arms are caused to grip said packages at the wrapping station, carry them to a point of delivery and then release them for discharge from the machine.

22. A wrapping machine, comprising a wrapping station, means for delivering wrappers to said station, means for delivering the articles to be wrapped to said station, means for wrapping said articles, and means for removing the completed packages from said station, said means including a pair of arms having angular extensions, separate members to each of which said extensions are pivoted, said members having a rocking motion part of which is in unison and part relative whereby said arms are caused to grip said packages at the wrapping station, carry them to a point of delivery and then release them for discharge from the machine, said arms being mounted for both vertical and horizontal movement.

23. A wrapping machine, comprising a wrapping station, means for delivering wrappers to said station, means for delivering the articles to be wrapped to said station, means for wrapping said articles, and means for removing the completed packages from said station, said means including a pair of arms having angular extensions, separate members to each of which said extensions are pivoted, said members having a rocking motion part of which is in unison and part relative whereby said arms are caused to grip said packages at the wrapping station, carry them to a point of delivery and then release them for discharge from the machine, a driving support for one of said members, and a friction support for the other, said members having a slotted connection whereby initial movement of the driven member produces pivotal movement of said arms on the other member.

24. In a wrapping machine the combination of a wrapping station, means at said station for wrapping articles delivered thereto, means for removing packages formed by said wrapping means, a receptacle into which said packages are adapted to be delivered in predetermined relation, and means for shifting said receptacle in timed relation to the delivery of the packages thereto.

25. In a wrapping machine the combination of a wrapping station, means at said station for wrapping articles delivered thereto, means for removing packages formed by said wrapping means, a receptacle into which said packages are adapted to be delivered in predetermined relation, and means actuated by said package removing means for shifting said receptacle in timed relation to the delivery of the packages thereto.

26. In a wrapping machine the combination of a wrapping station, means at said station for wrapping articles delivered thereto, means for removing packages formed by said wrapping means, a receptacle into which said packages are adapted to be delivered in predetermined relation, and means for shifting said receptacle in timed relation to the delivery of the packages thereto, said last-mentioned means comprising an inclined track, a carriage for the receptacle mounted on said track, means normally holding said carriage against downward movement on said track and means for periodically actuating said last-mentioned means to cause the same to release and reengage said carriage thereby permitting a predetermined advance thereof by gravity along said track.

27. In a wrapping machine the combination of a wrapping station, means at said station for wrapping articles delivered thereto, means for removing packages formed by said wrapping means, a receptacle into which said packages are adapted to be delivered in predetermined relation, and means for shifting said receptacle in timed relation to the delivery of the packages thereto, said last-mentioned means comprising a carriage for said receptacle, a track for said carriage and means, including a pawl spring-held in engagement with said carriage and means for periodically actuating said pawl, for releasing said carriage to permit predetermined advance thereof on said track.

28. In a wrapping machine the combination of a wrapping station, means at said station for wrapping articles delivered thereto, means for removing packages formed by said wrapping means, a receptacle into which said packages are adapted to be delivered in predetermined relation, and means for shifting said receptacle in timed relation to the delivery of the packages thereto, said last-mentioned means comprising a carriage for said receptacle, a track for said carriage, means, including a pawl spring-held in engagement with said carriage and means for periodically actuating said pawl, for releasing said carriage to permit predetermined advance thereof on said track, a collar loosely mounted on the machine and having a projection thereon and means associated with said package removing means for periodically impinging against said projection to actuate said collar and means for connecting said collar and pawl actuating means.

29. In a wrapping machine the combination of a wrapping station, means at said station for wrapping articles delivered thereto, means for removing packages formed by said wrapping means, a receptacle into which said packages are adapted to be delivered in predetermined relation, means for shifting said receptacle in timed relation to the delivery of the packages thereto, and means controlled by the position of said carriage for automatically terminating the operation of the machine under predetermined conditions.

30. In a wrapping machine the combination of a wrapping station, means at said station for wrapping articles delivered thereto, means for removing packages formed by said wrapping means, a receptacle into which said packages are adapted to be delivered in predetermined relation, means for shifting said receptacle in timed relation to the delivery of the packages thereto, and means controlled by the position of said carriage for automatically terminating the operation of the machine when said receptacle is filled.

31. In a wrapping machine the combination of a wrapping station, means at said station for wrapping articles delivered thereto, means for removing packages formed by said wrapping means, a receptacle into which said packages are adapted to be delivered in predetermined relation, means for shifting said receptacle in timed relation to the delivery of the packages thereto, and means controlled by the position of said carriage for automatically terminating the operation of the machine under predetermined conditions, said means comprising a clutch for connecting the operating elements of the machine with a source of power, and means spring-held in contact with said carriage and operable when the latter reaches a predetermined position for controlling said clutch.

32. In a wrapping machine the combination of a wrapping station, means at said station for wrapping articles delivered thereto, means for removing packages formed by said wrapping means, a receptacle into which said packages are adapted to be delivered in predetermined relation, means for shifting said receptacle in timed relation to the delivery of the packages thereto, and means controlled by the position of said carriage for automatically terminating the operation of the machine under predetermined conditions, said means comprising a clutch for connecting the operating elements of the machine with a source of power and means spring-held in contact with said carriage and operable when the latter reaches a predetermined position for controlling said clutch, said clutch being also manually operable.

33. In a wrapping machine the combination of a wrapping station, means at said station for wrapping articles delivered thereto, and means for delivering wrappers to said station, said last-mentioned means including a pair of coacting jaws adapted to receive a wrapper therebetween, means for positively moving one of said jaws, and means for providing friction opposing movement of the other jaw, the latter being idly mounted and adapted to be moved by the first-mentioned jaw when said jaws are in fully opened or fully closed relationship.

34. In a wrapping machine the combination of a wrapping station, means at said station for wrapping articles delivered thereto, means for feeding a web of wrapping material, cut-off mechanism for cutting said web into wrappers of predetermined length, and means for delivering the wrappers to said station, said last-mentioned means including a pair of coacting jaws arrangeable beneath said cut-off mechanism and movable between the same and said wrapping station, said jaws being adapted to receive a wrapper therebetween, means for positively moving one of said jaws and means for providing friction opposing movement of the other jaw, the latter being idly mounted and adapted to be moved by the first-mentioned jaw when said jaws are in fully opened or fully closed relationship.

35. In a wrapping machine the combination of a wrapping station, means at said station for wrapping articles delivered thereto, and means for delivering wrappers to said station, said last-mentioned means including a pair of coacting jaws formed to receive a wrapper therebetween and perform a preliminary forming operation thereon, said jaws having relative movement to open and close the same, and means for actuating said jaws to cause them to close upon a wrapper, carry the same to the wrapping station and release it in position to receive the articles to be wrapped.

36. In a wrapping machine the combination of a wrapping station, means at said station for wrapping articles delivered thereto, and means for delivering wrappers to said station, said last-mentioned means including a pair of coacting jaws adapted to receive a wrapper therebetween, said jaws being movable from the receiving point to a point of release near the wrapping station and having relative movement at each end of their course of travel for gripping and releasing the wrappers.

37. In a wrapping machine the combination of a support for the articles to be wrapped, means for arranging wrappers on said support, means for arranging the articles upon said wrappers, and means including coacting jaw members adapted to successively fold the opposite ends of said wrapper about said articles and to finally close together upon the package thus formed to arrange and hold the wrapper in proper relation during subsequent operations thereon.

38. In a wrapping machine the combination of a support for the articles to be wrapped, means for arranging wrappers on said support, means for arranging the articles upon said wrappers, and means including coacting jaw members pivoted to said support and adapted to successively fold the opposite ends of said wrapper about said articles and to finally close together upon the package thus formed to arrange and hold the wrapper in proper relation during subsequent operations thereon.

39. In a wrapping machine the combination of a support for the articles to be wrapped, means for arranging wrappers on said support, means for arranging the articles upon said wrappers, and means including coacting jaw members adapted to successively fold the opposite ends of said wrapper about said articles and to finally close together upon the package thus formed to arrange and hold the wrapper in proper relation during subsequent operations thereon, said support and jaw members together encircling the package and conforming to the configuration thereof.

In witness whereof, I hereunto subscribe my name to this specification.

BRUNO RADTKE.